March 24, 1953     M. JOUGUET     2,632,804
DEVICE FOR WAVE GUIDES EMPLOYING OVALIZED SECTIONS
Filed April 26, 1949
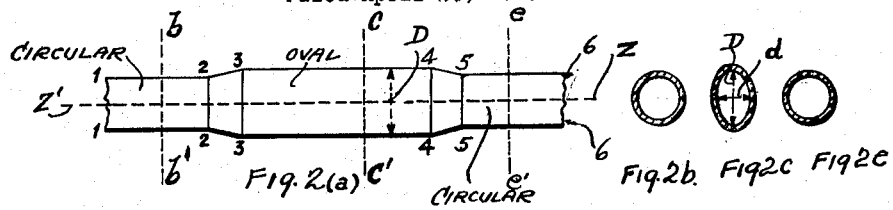
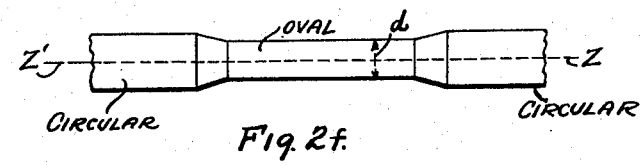
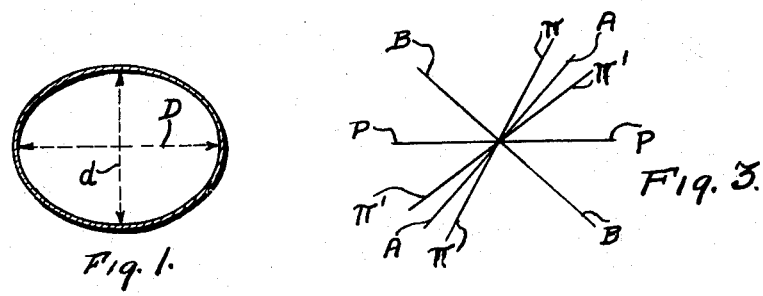
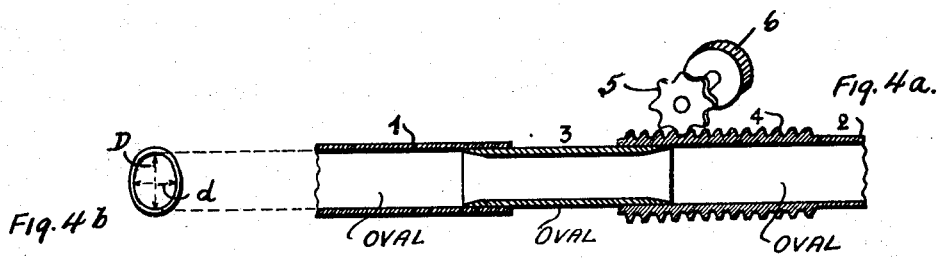
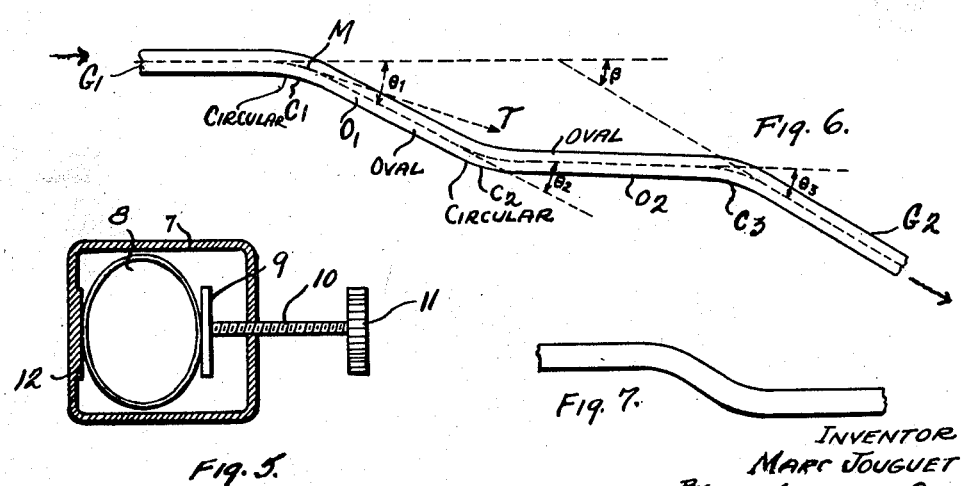
INVENTOR
MARC JOUGUET
By Adams + Bush
ATTORNEYS Patented Mar. 24, 1953

2,632,804

UNITED STATES PATENT OFFICE 2,632,804

DEVICE FOR WAVE GUIDES EMPLOYING OVALIZED SECTIONS

Marc Jouguet, Orsay, France, assignor to Compagnie Industrielle des Telephones, Paris, France, a corporation of France Application April 26, 1949, Serial No. 89,774
In France April 26, 1948

2 Claims. (Cl. 178—44)

In order to facilitate an understanding of the principle of operation of the devices which form the object of the present invention, it is necessary to indicate the essential properties of the waveguides whose cross section is in a form which departs more or less from the circular shape, and to describe the principal phenomena produced by the propagation in these guides of an electromagnetic sinusoidal disturbance.

In order to facilitate the description it will be assumed that the cross section is an oval curve similar to an ellipse (Fig. 1) and has two mutually perpendicular principal diameters, the respective lengths of which will be designated by $D$ and $d$. It will further be assumed that the waves in propagation are those which would be reduced to the modes as types of waves normally called $(E_1)$ or $(TM_1)$ and $(H_1)$ or $(TE_1)$, if the cross section were deformed in a continuous manner until it assumes the circular shape. The principle of the present invention, however, equally applies to waves of mode or type $(E_p)$ or $(H_p)$, $p$ being a non-zero integer and to more complicated forms of cross section.

Let us first of all consider a guide with circular cross section. A wave of mode $(E_1)$ which is propagated therein has two mutually perpendicular planes of symmetry, passing through the axis of the guide, and which will be called the principal plane and the anti-principal plane. These planes are characterised by the following properties:

(1) At any point of the principal plane, the electrical field is normal to this plane, and the magnetic field is directed along the intersection of this principal plane with any given plane perpendicular to the axis of the guide.

(2) At any point of the anti-principal plane, the magnetic field is perpendicular to this plane, while the vector representing the electrical field is contained in this plane. Moreover, there are, in the anti-principal plane, nodal lines parallel to the axis of the guide, at any point of which the magnetic field is zero, while the electrical field is parallel to the axis of the guide.

A wave of mode $(H_1)$ also presents two planes of symmetry, which will also be called the principal plane and the anti-principal plane. These planes are characterised by the following properties:

(1) At any point of the principal plane, the magnetic field is normal to this plane, and the electrical field is directed according to the intersection of this principal plane with any given plane perpendicular to the axis of the guide.

(2) At any point of the anti-principal plane, the electrical field is normal to this plane, and the vector representing the magnetic field is contained in this plane.

A wave of mode $(E_1)$ or $(H_1)$ may have any orientation whatsoever around the axis of the guide, this orientation being defined by the angle formed by the principal plane with a reference plane P connected to the guide and passing through its axis. If this angle is zero or a multiple of $\pi$, it will be said that the wave is an $(E'_1)$ or $(H'_1)$ mode of wave: if it be equal to an odd multiple of $\pi/2$ it will be said that the wave is an $(E''_1)$ or $(H''_1)$ mode of wave. Any wave of mode $(E_1)$ may be considered as the superposition of a wave of mode $(E'_1)$ and of a wave of mode $(E''_1)$; similarly any wave of mode $(H_1)$ may be considered as the superposition of a wave of mode $(H'_1)$ and of a wave of mode $(H''_1)$.

It is known that for these various modes of waves, the transversal field keeps an invariable direction at any point. It will be said that these are waves with rectilinear polarisation. The guide with circular cross section, however, can also propagate waves of modes $(E_1)$ or $(H_1)$ with elliptical polarisation, the end of the transversal field describing an ellipse. A wave of this kind can always be considered as the superposition of a wave of mode $(E'_1)$ and of a wave of mode $(E''_1)$ or of a wave of mode $(H'_1)$ and of a wave of mode $(H''_1)$, the two components having different phase constants.

Let us now consider a guide with oval cross section and assume that the difference $D-d$ of the two mutually perpendicular diameters is slight with respect to their mean value $(D+d)/2$. There are waves of which the characteristics differ little from that of the waves of the guide with circular cross section, and which will be designated by the same notations.

As reference plane P we will take the plane which passes through the axis of the guide and which contains the diameter D of a right cross section. There are waves of modes $(E'_1)$ and $(E''_1)$. These waves, however, have different phase speeds. There are in the same way waves of mode $(H'_1)$ and waves of mode $(H''_1)$ with different phase speeds.

There are, however, in this system no waves with elliptical polarisation. We will call "quasiwave with elliptical polarisation" the electromagnetic disturbance resulting from the superposition of a wave of mode $(E'_1)$ and of a wave of mode $(E''_1)$, or of a wave of mode $(H'_1)$ and a wave of mode (H″₁). Such a quasi-wave has the following properties:

(1) On a fairly short length of guide, it substantially merges with a wave with elliptical polarisation. Its characteristics, however, vary when one moves along the guide.

(2) There is, on the axis of the guide, a series of regularly spaced points, in the vicinity of which the quasi-wave is substantially merged with a wave of rectilinear polarisation as above defined. In two successive points of this kind, of which the distance apart will be designated by $l$, the principal plane of this wave has symmetrical orientations with respect to the plane P.

The length $l$ depends, for a given type of wave, on D and on $d$, as also on the wave length in free space $\lambda$.

(1) For a wave of mode ($E_{1,1}$) we get substantially:

$$(1) \quad l = 0.532 \frac{(D+d)^2}{D-d} \sqrt{\frac{\pi^2(D+d)^2}{4\lambda^2} - 14.68}$$

For example, for $\lambda=1$ cm, $D=10.5$ cm. and $D=9.5$ cm. we get approximately $l=6.70$ m.

(2) For a wave of mode ($H_{1,1}$) we get substantially:

$$(2) \quad l = 0.126 \frac{(D+d)^2}{D-d} \sqrt{\frac{\pi^2(D+d)^2}{4\lambda^2} - 3.38}$$

For example, for $\lambda=6$ cm., $D=4.04$ cm. and $d=3.96$ cm., we get approximately $l=1$ m.

From the foregoing it follows that it is possible, in accordance with the present invention, by inserting an oval guide cross section into a guide with circular section:

(1) To modify the orientation around the axis of the guide of a wave with rectilinear polarisation as above defined propagated in the guide, and bring its principal plane to coincide with any given plane passing through the axis of the guide.

(2) To transform a guide with elliptical polarisation propagated in the guide into a wave with rectilinear polarisation of the corresponding type, the principal plane of this wave coming to coincide with any given plane passing through the axis of the guide.

Let us assume first of all that we have to effect the change of direction of a guide. The guide with circular section 1—2 (Fig. 2(a)) is connected to a guide, 2—5 with oval cross section, and the latter is connected to a guide with circular cross section 5—6. Fig. 2(a) shows a cross section through the system taken through the plane passing through its axis $z'z$ and through the diameter D of the right cross section of the ovalised guide. Figs. 2(b), 2(c) and 2(e) respectively represent the right cross sections $bb'$, $cc'$ and $ee'$. Fig. 2(c) shows a section through the system taken through the plane passing through the axis $z'z$ and perpendicular to the plane of Fig. 2(a).

At the ends 2—3 and 4—5 of the guide with oval cross section, the ovalisation may be variable, the right cross section passing progressively, in the portion 2—3, from the circular form of Fig. 2(b) to the oval form of Fig. 2(c), then in the portion 4—5 from the oval form of Fig. 2(c) to the circular form of Fig. 2(e). In this way we avoid the disturbance produced in the propagation of the waves by too sudden a variation in the shape of the straight section.

On the other hand, the central portion of the device comprised between two planes of straight circular cross section such as $bb'$ and $ee'$ or rather 2—2 and 5—5, can, in accordance with the present invention, rotate around the axis $z'x$.

Let us now take as the plane of Fig. 3 a plane perpendicular to the axis $z'z$ of the guide. On this figure the important planes passing through the axis $z'z$ are represented by their traces.

It will be assumed that a wave of mode ($E_1$) or ($H_1$) is propagated in the portion 1—2. Let $\pi$ be the principal plane of this wave. Let A and B be the planes respectively containing the diameters D and $d$ of the cross section of the ovalised guide. If the length L of this ovalized guide has a suitable value, we still have at its output a wave of mode ($E_1$) or ($H_1$) but the principal plane of this wave occupies a position $\pi'$ symmetrical to $\pi$ in relation to planes A and B.

If the ovalised guide be caused to rotate around its axis to a position at an angle $\phi$, the plane $\pi'$ rotates, in the same direction, to a position at an angle $2\varphi$. When the guide has made a quarter-turn, the plane has successively occupied all the possible positions around the axis. Thus, in accordance with the present invention, it is possible, by suitable orientation of the ovalised guide, to cause this plane to have any given orientation whatsoever.

In order to have, at the output of the ovalised guide, a wave with rectilinear polarisation as above defined, it is necessary to make a suitable choice of the characteristics of the ovalised guide, i. e. the diameters D and $d$ of its right cross section and its length L. According to the present invention the length L must be an odd multiple of the length $l$ or be equal to the length $l$ given by the Equation 1 if it be a question of a wave of mode ($E_{1,1}$) and by the Equation 2 where a wave of mode ($H_{1,1}$) is concerned.

The length L, to be given to the ovalised guide, depends for given values of D and $d$ on the length in free space of the wave employed. It may thus be useful to be able to adjust the length L of the ovalized guide as desired. For this purpose, the ovalised guide may be composed of two parts sliding into each other after the fashion of the tubes on which the lenses of optical instruments are mounted.

Figs. 4a and 4b show by way of example an embodiment of a device of this kind. In this figure, 1 and 2 are two parts of the oval-guide section, between which a connecting member 3 extends and into which it penetrates. The part 2 is provided with a toothed rack 4, engaging with a cog wheel 5 in one piece with a control knob 6. When knob 6 is turned, the part 2 slides in one direction or the other on the member 3, and the total length of the guide segment is increased or reduced.

It is, however, possible, instead of varying the length of the guide, to obtain the adjustment by varying its ovalisation. Fig. 5 shows, by way of example, a method of carrying out this arrangement. In this figure, 7 designates an enclosure in which the oval-section guide 8 is contained; the latter is made so as to be able to undergo elastic deformation; on the other hand a small plate 9, in one piece with a threaded rod 10, screwing into one wall of enclosure 7, leans on the guide. By screwing this rod more or less by means of knob 11, the guide is more or less crushed against a shoulder 12 of the opposite wall of enclosure 7, thus modifying the ovalisation of the guide.

It is, moreover, possible to combine the device for adjusting the length L of the ovalised guide with the device for adjusting the ovalisation.

When L is not a multiple of the length $l$ defined by one of the Equations 1 or 2 the devices which have just been described have the effect of modifying the state of polarisation of the wave which is being propagated and they can be used according to the present invention, to obtain such a result.

In particular, as has been indicated above, a wave with elliptical polarisation can be transformed into a wave of the same type with rectilinear polarisation as above defined. It is sufficient for this to adjust either the length L or the ovalisation. It is also possible to act on the length L and on the ovalisation at the same time.

The position of the principal plane of the wave, obtained at the output of the ovalised wave, depends on the orientation of this guide around its axis.

By modifying this orientation and by at the same time suitably adjusting its length or its ovalisation, or both at once, it is possible, according to the present invention, to obtain a wave with rectilinear polarisation of which the principal plane will have any given position whatsoever.

The preceding devices can, in accordance with the present invention, be used in combination with curved guides with circular cross section, in order to connect two straight guides $G_1$ and $G_2$ (Fig. 6) of which the axes have different directions, making with respect to each other any angle B, the assembly thus formed having the object of enabling a wave of the so-called ($H_0$) or ($TE_0$) type to pass from guide $G_1$ into the guide $G_2$.

The guide $G_1$ is connected to a guide with circular cross section $C_1$, of which the axis is curved in a plane Q which is the plane of Fig. 6 and which contains the axis of guide $G_1$. There is connected to guide $C_1$ either directly or through a straight guide section with circular cross section, an ovalised guide $O_1$ such as that shown in Fig. 2f. The length, the ovalisation and the orientation of this guide around its axis may be either fixed or adjustable. The axis of guide $O_1$ is located in the plane Q. There is connected to the guide $O_1$, either directly or through a straight guide with circular cross section, a guide with circular cross section $C_2$, similar to guide $C_1$, and having its axis curved in the plane Q. To the guide $C_2$ is connected, either directly or by means of a straight guide with circular cross section, an ovalised guide $O_2$ similar to $O_1$. There is connected to guide $O_2$ either directly or by means of a straight guide with circular cross section, a curved guide $C_3$ similar to $C_2$ and to $C_1$. Finally the guide $G_2$ is connected to the guide $C_3$.

On the winding line formed by the axes of the various guides and situated in the plane Q, we will choose as the positive direction of travel that going from the guide $G_1$ to the guide $G_2$. Let MT be the positive semi-tangent at any point M of this line. When the axis of the guide $C_1$ is traversed in the positive direction, this semi-tangent rotates at an angle of which the algebraic value will be designated by $\theta_1$. Similarly $\theta_2$ and $\theta_3$ will denote the algebraic values of the similar angles for the guides $C_2$ and $C_3$.

It will be assumed that, in the guide $G_1$, a wave is propagated of the type called ($H_{0,1}$) or ($TE_{0,1}$) and we will again designate by $\lambda$ the wave length in free space. Let R be the radius of the straight section of the guides with circular cross section.

The applicant, in his application Ser. No. 81,897, filed March 17, 1949, for "Connecting device for wave guides of any direction" have shown that if the angle $\theta_1$ is, in absolute value, an odd multiple of the angle (3) $$\theta_0 = 155 \frac{\lambda}{R} \text{ (degrees)}$$

the guide $C_1$ transforms the wave of mode ($H_{0,1}$) into a wave of mode ($E_{1,1}$) taking the plane Q to be the principal plane. It is assumed that this is the case, and the guide $O_1$ is orientated around its axis so that its planes of symmetry (designated above by A and B) form, with the plane Q, an angle of 45°. Then again, the length L and the ovalisation of ovalized guide $O_1$ are adjusted so that L is an odd multiple of the length $l$ given by Equation 1. At the output of $O_1$ we get a wave of mode ($E_{1,1}$) taking the plane Q to be the anti-principal plane. This wave passes without modification into the circular guide $C_2$ whatever the angle $\theta_2$ may be. The ovalized guide $O_2$ is orientated around its axis so that its planes of symmetry form an angle of 45° with the plane Q, and its length and ovalisation are adjusted as for guide $O_1$. At the output of $O_2$, we get a wave of mode ($E_{1,1}$) taking the plane Q to be the principal plane. Finally it is assumed that the angle $\theta_3$ is, in absolute value, an odd multiple of the angle $\theta_0$ defined by (3); the circular guide ($C_3$) then transforms the wave of mode ($E_{1,1}$) into wave of mode ($H_{0,1}$) and this wave is then propagated into the guide $G_2$.

Having chosen $\theta_1$ and $\theta_3$ as has been stated, we shall choose $\theta_2$, in accordance with the present invention, so that we have in algebraic values:

(4) $$\beta = \theta_1 + \theta_2 + \theta_3$$

One might be led to subjecting the device of Fig. 6 to some modifications which are comprised in the present invention.

(a) As has been shown in the above mentioned patent application, it is possible if the guides $G_1$ and $G_2$ are not in the same plane, to insert, at any place in the device, one or more guides with circular cross section of which the axis is curved in S-shape, in a plane which cannot coincide with the plane Q, the axis thus curved having parallel directions at the input and output of this guide. Such an S-shaped guide is shown in Fig. 7. The axes of the various guides of Fig. 6 can then no longer be contained in the same plane Q, but in two or more parallel planes.

(b) It is not necessary for the various guides to be contained in the same plane Q or in parallel planes. The axes $C_1$, $C_2$, $C_3$ may be contained in three planes, $Q_1$, $Q_2$, $Q_3$, which form any angles whatsoever with respect to each other. In this case the device can still operate; but the ovalized guides $O_1$ and $O_2$ must be given suitable orientations around their axes. The planes of symmetry of the guide $O_1$ form with the plane $Q_1$ and those of the guide $O_2$ with the plane $Q_2$, angles which are generally different from 45°. The angles $\theta_1$ and $\theta_3$ are still odd multiples of the angle $\theta_0$; but the angle $\theta_2$ has a value which may differ considerably from those resulting from Equation 4.

In order to make the explanation more concrete, the position has been taken most often in the foregoing in the case in which the waves which are in propagation are of the so-called ($H_{0,1}$), ($E_{1,1}$) and ($H_{1,1}$) types. The present invention applies more generally to waves of the so-called ($H_{0,n}$), ($E_{1,n}$) and ($H_{1,n}$) types, $n$ being any integer. It is only necessary to subject Formulae 1, 2 and 3 to the modifications indicated above. Apart from this the arrangements are constructed in the same manner.

Let $\mu_n$ be the $n^{th}$ non-zero root of the Bessel function $J_1$ (notation of Jahnke and Ende's tables) and let $\nu_n$ be the $n^{th}$ non-zero root of the derivative $J_1'$ of this function.

(1) The Formula 1 which relates to the waves $(E_{1,1})$ must be replaced by the following, which relates to the waves $(E_{1,n})$:

$$(5) \quad l = \frac{\pi}{4} \frac{(D+d)^2}{D-d} \frac{1}{\mu_n^2} \times \sqrt{\frac{\pi^2(D+d)^2}{4\lambda^2} - \mu_n^2}$$

(2) The Formula 2 relating to the waves $(H_{1,1})$ must be replaced by the following, which relates to the waves $(H_{1,n})$:

$$(6) \quad l = \frac{\pi}{4} \frac{(D+d)^2}{D-d} \frac{1}{\nu_n^2} \frac{\nu_n^2-1}{\nu_n^2+1} \sqrt{\frac{\pi^2(D+d)^2}{4\lambda^2} - \nu_n^2}$$

Thus, if a segment of ovalised guide, such as that of Fig. 2f, has a length L which is an odd multiple of the length $l$ given by (5), it transforms a wave $(E_{1,n})$ with rectilinear polarisation as above into a wave of the same type, but orientated in a different manner around the axis. If it has a length L which is an odd multiple of the length $l$ or equal to the length $l$ given by (6) it transforms in the same way a wave $(H_{1,n})$ with rectilinear polarisation into a wave of the same type but differently orientated around the axis.

(3) The Formula 3 which relates to the transformation by a curved guide of a wave $(H_0)$ into a wave $(E_{1,1})$ must be replaced by the next, which relates to the transformation of a wave $(H_{0,n})$ into wave $(E_{1,n})$ and which has been indicated in the above mentioned patent application:

$$(7) \quad \theta_0 = \frac{180°}{\pi\sqrt{2}} \mu_n \frac{\lambda}{R}$$

The device of Fig. 6 makes it possible to pass a wave of mode $(H_{0,n})$ from guide $G_1$ into guide $G_2$ provided that:

(a) $\theta_1$ and $\theta_2$ are, in absolute value, odd multiples of the angle $\theta_0$ defined by (7).

(b) The lengths of the ovalised guides $O_1$ and $O_2$ are odd multiples of the length $l$ calculated by the Formula 5.

What I claim is:

1. Wave guide system, adapted to cause a $TE_{0,n}$ type wave, having a wave length in free space $\lambda$, to pass from a first rectilinear guide with circular cross section to another rectilinear guide with circular cross section, said two rectilinear guides being not in the extension of each other, said wave guide system comprising, serially connected together between said two rectilinear guides with circular cross section, at least two rectilinear guides with oval cross section, said two rectilinear guides with oval cross section being separated from each other and from said rectilinear guides with circular cross section by auxiliary circular cross section guides with curved axis, all of said guides being serially connected together and each end of each said guide being connected to an adjacent end of an adjacent said guide, the central angles of the arcs defined by each of the two said auxiliary circular cross section guides which are adjacent to said rectilinear guides with circular cross section being an odd multiple of $$\frac{180\mu_n\lambda}{\pi\sqrt{2}R}$$

degrees, $\mu_n$ being the $n$th non-zero root of the Bessel function $J_1=0$, and R being the radius of the cross section of the guides with circular cross section, and each rectilinear guide with oval cross section having a length which is an odd multiple of $$\frac{\pi(D+d)^2 1}{4(D-d)\nu_n^2} \sqrt{\frac{\pi^2(D+d)^2}{4\lambda^2} - \nu_n^2}$$

D and d being respectively the large diameter and small diameter of the cross section of the guides with oval cross section and $\nu_n$ being the $n$th non-zero root of the derivative $J'_1$ of the Bessel function $J_1=0$.

2. Wave-guide according to claim 1, characterised in this, that in the case in which the axes of the various guides are in the same plane, the orientation of the guides with oval cross-section is chosen so that the planes passing through their axes and respectively containing the large and the small diameter of their cross section, are symmetrically arranged with respect to said plane.

MARC JOUGUET.

REFERENCES CITED

The following references are of record in the file of this patent:

UNITED STATES PATENTS

| Number | Name | Date |
|---|---|---|
| 2,403,289 | Korman | July 2, 1946 |
| 2,425,345 | Ring | Aug. 12, 1947 |

FOREIGN PATENTS

| Number | Country | Date |
|---|---|---|
| 503,467 | Great Britain | Apr. 6, 1939 |